United States Patent [19]
Carme et al.

[11] Patent Number: 5,943,641
[45] Date of Patent: Aug. 24, 1999

[54] METHOD AND DEVICE FOR RECOVERING A WANTED ACOUSTIC SIGNAL FROM A COMPOSITE ACOUSTIC SIGNAL INCLUDING INTERFERENCE COMPONENTS

[75] Inventors: Christian E. Carme, Aubagne; Alain R. Roure, Marseilles, both of France

[73] Assignee: Technofirst, Aubagne, France

[21] Appl. No.: 09/068,508

[22] PCT Filed: Nov. 12, 1996

[86] PCT No.: PCT/FR96/01781

§ 371 Date: Jul. 8, 1998

§ 102(e) Date: Jul. 8, 1998

[87] PCT Pub. No.: WO97/18550

PCT Pub. Date: May 22, 1997

[30] Foreign Application Priority Data

Nov. 13, 1995 [FR] France .................................. 95 13407

[51] Int. Cl.⁶ .................................................. H04R 19/04
[52] U.S. Cl. ...................... 702/191; 702/190; 702/195; 702/103; 73/1.82; 73/612
[58] Field of Search ..................... 702/190, 191, 702/195, 103, 104; 73/1.59, 1.63, 1.82, 587, 612; 381/71.11, 71.12, 92

[56] References Cited

U.S. PATENT DOCUMENTS

| | | | |
|---|---|---|---|
| 4,433,435 | 2/1984 | David | 381/94.2 |
| 4,630,304 | 12/1986 | Borth et al. | 381/94.3 |
| 5,040,156 | 8/1991 | Foller | 367/118 |
| 5,402,669 | 4/1995 | Pla et al. | 73/1.82 |
| 5,463,893 | 11/1995 | Pla et al. | 702/190 |
| 5,471,195 | 11/1995 | Rickman | 381/92 |
| 5,479,813 | 1/1996 | Pla et al. | 702/190 |

*Primary Examiner*—John Barlow
*Assistant Examiner*—Bryan Bui
*Attorney, Agent, or Firm*—Oliff & Berridge, PLC

[57] ABSTRACT

The device for extracting a useful acoustic signal from a composite acoustic signal including nuisance components includes: first sensor component for picking up the composite acoustic signal; second sensor component for picking up, in real-time, the reference acoustic signal, which is substantially correlated with the nuisance components of the composite acoustic signal; adaptive filtering component; and extraction component. The coefficients of the filtering component are adapted in real time according to an algorithm chosen so as to minimize the energy of the composite acoustic signal as a function of the energy of the reference acoustic signal, until the signal leaving the output of the extraction component corresponds substantially to the useful acoustic signal selectively rid of the nuisance components.

6 Claims, 2 Drawing Sheets

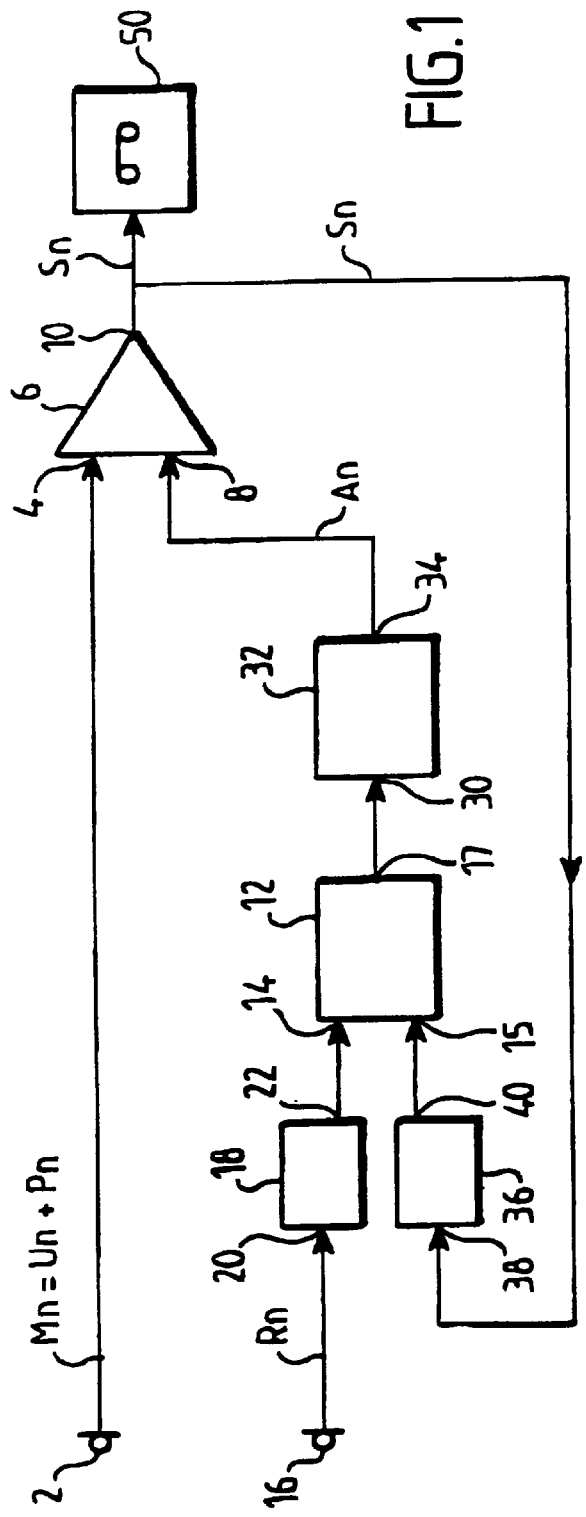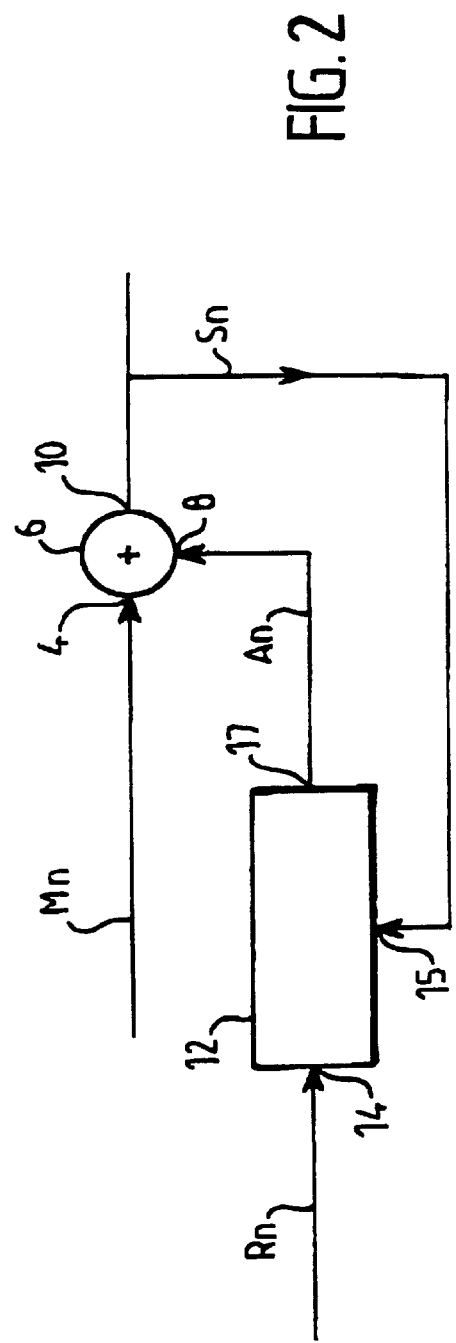

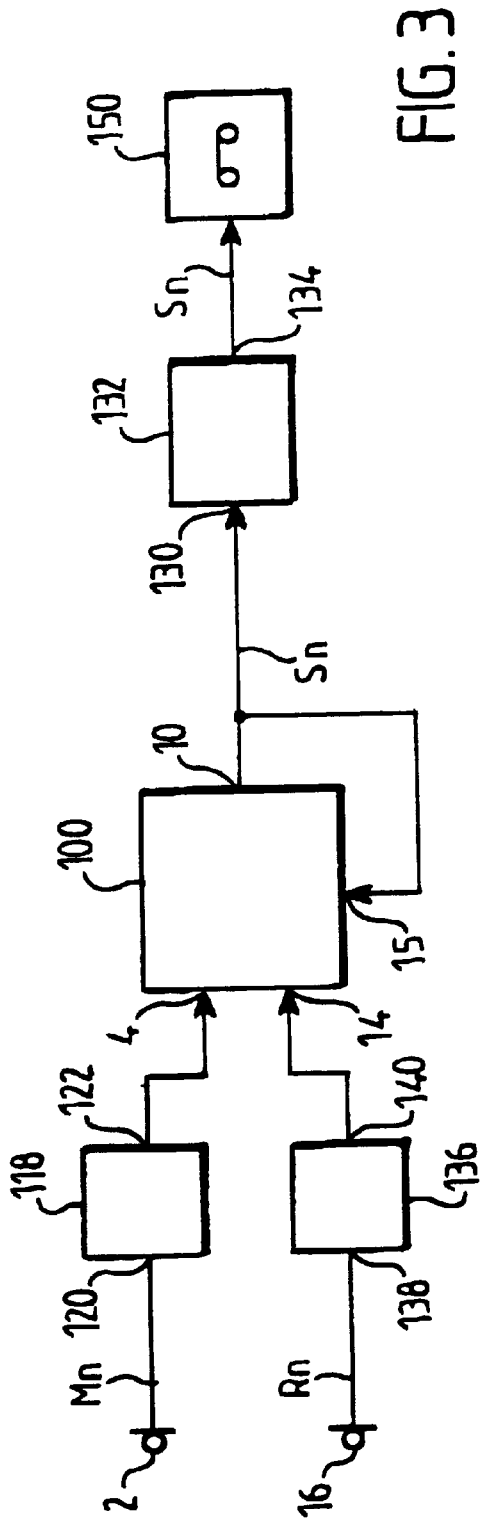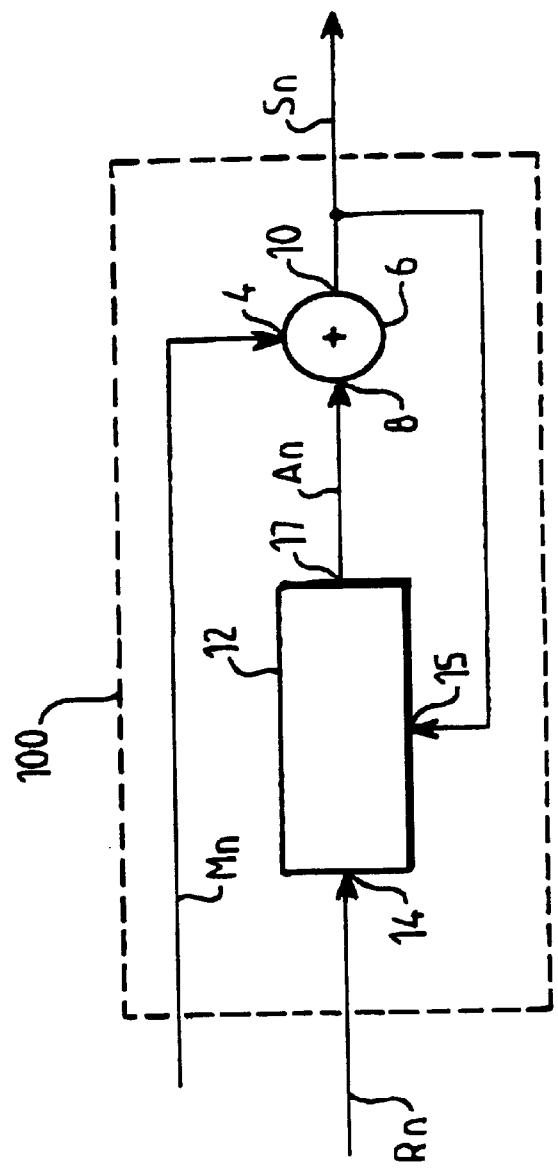

METHOD AND DEVICE FOR RECOVERING A WANTED ACOUSTIC SIGNAL FROM A COMPOSITE ACOUSTIC SIGNAL INCLUDING INTERFERENCE COMPONENTS

FIELD OF THE INVENTION

The present invention relates to the extraction of a useful acoustic signal from a composite acoustic signal comprising nuisance components.

It finds an application in the processing of a composite acoustic signal comprising a useful acoustic signal, for example the voice which it is desired to record, and nuisance components originating from some source of noise (noise from a machine or vehicle, etc.), the said nuisance components being capable of disturbing the recording of the voice.

DESCRIPTION OF RELATED ART

It is already known to cancel nuisance components contained in a composite acoustic signal.

For example, the Patent GB-A-2273359 describes a device for processing a useful acoustic signal so as to relieve if of its nuisance component. Two geophones pick up the same composite signal consisting of a useful signal and of its nuisance components. A delay which depends on the nature of the useful signal and on the distance between the two sensors is imparted to one of the signals thus picked up and the signals, are next subtracted in order to extract the useful signal relieved of its nuisance components.

Such a device is complicated and of limited use on account of the delay to be imparted to the propagation of the signals, geometric constraints related to the siting of the sensors and filtering limitations related to the nature of the useful signal to be processed.

It is also known to use characteristics relating to the nuisance components to be canceled (spectral density and bandwidth for example), as well as to the useful acoustic signal to be processed (periodicity and distribution).

However, access to all these characteristics is expensive and difficult to set in place, and may sometimes even be impossible when the nuisance noise is random, liable to vary over time, in terms of level and frequency, and/or stretches over a wide band of frequencies and when, additionally, there is no a priori knowledge regarding the characteristics of the useful acoustic signal.

SUMMARY OF THE INVENTION

The present invention provides a solution to precisely this problem.

It aims to provide an extractor of a useful acoustic signal from a composite acoustic signal comprising nuisance components, which may be of any type, even random and broadband, and which are liable to disturb the processing of the useful acoustic signal in respect of which no a priori knowledge is available.

It pertains to the device for extracting a useful acoustic signal from a composite acoustic signal comprising nuisance components, including:
first sensor means, which are arranged at a first chosen location and are able to pick up the composite acoustic signal,
second sensor means, which are arranged at a second location chosen according to a predetermined geometric relationship with the first location, and are able to pick up, in real time, a reference acoustic signal which is substantially correlated with the nuisance components of the composite acoustic signal and is capable of propagating from the said second location to the said first location,
filtering means, of the adaptive type, possessing a first input linked to the second sensor means, a second input and an output, and
extraction means possessing a first input linked to the first sensor means, a second input linked to the output of the adaptive filtering means, and an output linked to the second input of the adaptive filtering means.

According to a general definition of the invention, the second location is chosen so that the reference acoustic signal contains no information related to the useful signal and the filtering means are able to minimize the energy of the composite acoustic signal as a function of the energy of the reference acoustic signal, by adapting at least some of the filtering coefficients in real time, until the signal leaving the output of the extraction means corresponds substantially to the useful acoustic signal selectively rid of the nuisance components.

The subject of the invention is also a process for extracting a useful acoustic signal relieved of its nuisance components, implemented by the abovementioned extraction devica, in which the process comprises the following steps:

a) providing first sensor means, which are arranged at a first chosen location and are able to pick up the composite acoustic signal, b) providing second sensor means, which are arranged at a second location chosen according to a predetermined geometric relationship with the first location, and are able to pick up, in real time, a reference acoustic signal which is substantially correlated with the nuisance components of the composite acoustic signal and is capable of propagating from the said second location to the said first location, c) providing filtering means, of the adaptive type, possessing a first input linked to the second sensor means, a second input and an output, and d) providing extraction means possessing a first input linked to the first sensor means, a second input linked to the output of the filtering means, and an output.

According to an important characteristic of the process according to the invention, the second location is chosen so that the reference signal contains no information related to the useful signal, and the process comprises a step consisting in:

e) minimizing the energy of the composite acoustic signal as a function of the energy of the reference acoustic signal, by adapting at least some of the filtering coefficients in real time until the signal leaving the output of the extraction means corresponds substantially to the useful acoustic signal selectively rid of the nuisance components.

BRIEF DESCRIPTION OF THE DRAWINGS

Other characteristics and advantages of the invention will emerge in the light of the detailed description below and of the appended drawings in which:

FIG. 1 diagrammatically represents the architecture of the elements making up the device according to the invention, with analog summator means;

FIG. 2 is a functional diagram of the elements of FIG. 1;

FIG. 3 is a diagrammatic representation of the architecture of the elements making up the device according to the invention, with digital summator means; and FIG. 4 is a functional diagram of the elements of FIG. 3.

DETAIL OF DESCRIPTION

In FIG. 1, a sensor 2 is arranged at a chosen location so as to pick up, in real time, a composite acoustic signal Mn to be processed. This composite signal consists of a useful signal Un and nuisance components Pn. The useful signal Un is for example the voice of a person which it is desired to record. The characteristics of the useful acoustic signal and of the nuisance components are not known a priori. The nuisance components may originate from any source of noise arranged some distance from the sensor 2.

The signal Mn picked up by the sensor 2 is here a signal of analog type.

Preferably, the sensor 2 is an omnidirectional microphone, so as to pick up the composite signal.

Of course, any sensor capable of detecting an acoustic signal or its representation may be applied to the invention.

With reference to FIGS. 1 and 2, the composite signal Mn is applied to the first positive input 4 of a summator element 6, of the analog type, which will perform the extraction of the useful acoustic signal from the composite acoustic signal, as will be seen in greater detail below.

For example, the summator element is an operational amplifier such as that marketed by the TEXAS INSTRUMENTS company, under the reference TLE 2061, organized here so that the signal supplied to these two inputs exhibits substantially the same dynamic level so as to allow optimal extraction.

The summator element 6 comprises a second positive input 8 which receives a signal An leaving the output 17 of adaptive filtering means 12, via restitution means 32 which will be described in greater detail below. This signal An is here likewise analog.

The summator element forms the sum of the analog signals Mn and An and, at its output 10, delivers an analog signal Sn representative of the said sum of the signals Mn and An.

The adaptive filtering means 12 comprise a first input 14 receiving the signal from the second sensor 16. This sensor 16 provides a reference acoustic signal Rn, which is strongly correlated with the nuisance components Pn to be canceled. The filtering means comprise a second input 15 which will be described in greater detail below.

Advantageously, the reference acoustic signal Rn does not contain information related to the useful signal Un. It is also analog here.

The sensor 16 is arranged at a location chosen according to a particular geometric relationship with the source of noise (not represented).

For example, the sensor 16 is arranged in proximity to the nuisance noise source.

The sensor 16 is for example a directional microphone, so as to pick up the nuisance acoustic signal from the nuisance noise source.

Of course, other transducers may be applied to the picking up of the reference signal. Here, the only constraint is of picking up, in real time, a reference acoustic signal which can propagate from the location at which the sensor 16 is arranged to the location at which the sensor 2 is arranged.

It is relevant to note here that the designation "reference acoustic signal" does not signify "an acoustic signal emanating from a synchronous reference". Here, the reference acoustic signal is an acoustic signal which is picked up by a microphone and which will serve as a reference for processing the signal. It does not emanate from a synchronous reference. Neither does it correspond to the inverse of the noise to be attenuated.

It is known that the principle of active attenuation is based on the fact that the speed of propagation of sound is slower than the speed of propagation of electricity. In order to comply with this temporal delay, it is expedient to establish a minimum distance separating the sensor 2 and the sensor 16. This minimum distance is less than 0.5 m to 2 m for noise with a broad spectral band or spectral lines.

The essential functions carried out by the adaptive filtering means 12 and the analog summator means 6 have been described heretofore with reference to FIG. 2. With reference to FIG. 1, the structure of the device according to the invention is supplemented with an acquisition stage upstream of the adaptive filtering means and with a restitution stage mounted downstream of the adaptive filtering means.

More precisely, the upstream stage comprises analog/digital acquisition means 18 which receive the reference signal Rn. These acquisition means comprise, in series, an input pre-amplifier element (not represented), a conditioning filter (not represented) and an analog/digital converter (not represented).

The pre-amplifier element possesses an input 20 which receives the signal from the sensor 16, and an output. The conditioning filter possesses an input linked to the output of the pre-amplifier element, and an output. The analog/digital converter possesses an input linked to the output of the conditioning filter and an output 22 applied to the input 14 of a digital signal processor 12 which carries out the adaptive filtering.

The conditioning filter is advantageously an anti-overlap filter with a cutoff frequency chosen according to the application. For example, the cutoff frequency is equal to 2142 Hz for the attenuation of noise emanating from a compressor (spectral lines).

The processor 12, also termed DSP for DIGITAL SIGNAL PROCESSOR, is for example that marketed by the TEXAS INSTRUMENTS company under the reference TMS320C25.

The output 17 of the processor is applied to the input 30 of a restitution module 32 which comprises, in series, a digital/analog converter (not represented) and a smoothing filter (not represented).

For example, the smoothing filter is a filter of the low-pass type whose input receives the signal leaving the digital/analog converter and whose output 34 is linked to the second input 8 of the summator means 6.

The output 34 of the digital/analog restitution module delivers the signal An.

The sampling frequency of the analog/digital and digital/analog converters is chosen so that it is possible to sample the acoustic signals during the time required for the reference acoustic signal to propagate from the location at which it is picked up to the location at which it will perturb the useful acoustic signal.

The cutoff frequency of the conditioning and smoothing filters is chosen to be relatively high in the case of random noise, since the delay in the electronics increases as the value of the cutoff frequency decreases.

For example, for a cutoff frequency of the order of 2000 Hz and a sampling frequency of 5000 Hz, the minimum distance between the sensors 2 and 16 is 0.4 m.

For example, for a cutoff frequency of the order of 800 Hz and a sampling frequency of 2000 Hz, the minimum distance between the sensors 2 and 16 is 1 m.

In the case of muted and low-pitched noise which corresponds to frequencies below those of the voice, it is possible to choose relatively low sampling frequencies, that is to say of the order of 2 to 5 kHz, with summator means of analog type.

At its second input 15, the processor 12 receives a signal from another acquisition module 36 whose input 38 receives a signal from the output of the summator means 6, that is to say the signal Sn. This second acquisition module 36 comprises an output 40 applied to the input 15 of the processor 12.

In practice, the acquisition module 36 comprises the same elements as the acquisition module 18, namely, in series, an input pre-amplifier, a conditioning filter and an analog/digital converter.

According to the invention, the processor 12 runs an algorithm for minimizing the energy of the composite acoustic signal Mn as a function of the energy of the reference acoustic signal Rn, until the acoustic signal Sn leaving the output of the summator means corresponds substantially to the useful acoustic signal Un selectively rid of the nuisance components Pn.

The minimization algorithm is preferably that referred to as LMS, standing for LEAST MEAN SQUARE.

According to the principle of active attenuation, the signal An must correspond to the amplitude of the signal Pn but be in phase opposition relative to it.

The signal An is obtained via the acquisition of the signal Rn and of the signal Sn.

The sum of the signals Mn and An makes it possible to deduce the signal Un therefrom.

At the instant t, the processor 12 determines the weighting coefficients W to minimize the energy of the signal Sn until this energy corresponds to that of the useful signal Un.

For example, the number of weighting coefficients W is 90.

The signal Sn here corresponds to the noise-cleaned composite signal. The latter can be recorded with the aid of an appropriate recorder 50 on an audio tape, or drive a loudspeaker via a power amplifier (these are not represented).

It should be noted that the signal Sn is in fact the signal to the minimized.

Under these conditions, the signal Sn is re-injected into the input 15 of the filtering means which adapt the coefficients of the filter W to calculate the signal An at the instant t+1.

The minimization operation is repeated for all the samples of the signals Rn and Sn acquired according to the invention.

It is relevant to note that the active attenuation device according to the invention constitutes simplified feed-forward filtering in which the source of counter-noise does not possess any mechanical or acoustic actuator.

Here, dispensing with the mechanical or acoustic actuator of the source of counter-noise simplifies the calculations insofar as the transfer function is now equal to the path between the output 17 of the processor and up to the input 15 of the said processor, via the restitution block 32, the summator means 6 and the acquisition block 36. This path is therefore made up solely of electronic elements in which the propagation of the electrical signal is very fast relative to the propagation of the sound waves. So short a transfer function results in a considerable saving of calculation time as compared with feed-forward filtering with a source of counter-noise equipped with a mechanical or acoustic actuator.

With reference to FIG. 3, a variant of the architecture of the device according to the invention is represented, in which the summator of the signals Mn and An is now digital, instead of being analog as with reference to FIGS. 1 and 2. Under these conditions, digital processing means 100 are provided which carry out the functions of the digital summator means 6 and of the adaptive filtering means 12 described earlier.

In practice, the digital processing means possess a first input 4 which corresponds to the input 4 of the summator means which were described with reference to FIGS. 1 and 2, a second input 14 which corresponds to the first input 14 of the filtering means 12 which were described with reference to FIGS. 1 and 2, a third input 15 which corresponds to the second input 15 of the filtering means 12 which were described with reference to FIGS. 1 and 2, and an output 17 which corresponds to the output 17 of the filtering means 12 which were described with reference to FIGS. 1 and 2.

It is relevant to note that here the third input 15 is virtual in the case of the digital summator, since the digital value of the signal Sn, corresponding to the sum of the signals Mn and An, is known to the processor.

In a manner substantially similar to the analog version, the digital device furthermore comprises an acquisition stage comprising third analog/digital acquisition means 118, possessing an input 120 linked to the first sensor means 2 and an output 122 linked to the first input 4 of the digital processing means 100; and fourth analog/digital acquisition means 136, possessing an input 138 linked to the second sensor means 16 and an output 140 linked to the second input 14 of the digital processing means 100.

The signals Mn and Rn are both applied to the digital processor 100, via the respective acquisition modules 118 and 136. The output 17 of the processor 100, which delivers the digital signal Sn, is applied to the input 130 of a restitution block 132 which restores, in analog fashion, the signal Sn to a useful-signal processing device, for example a recorder block 150.

The function carried out by the processor 100 is represented with reference to FIG. 4, as regards the summing of the signals Mn and An.

This operation is carried out by digital summator means 6 contained in the DSP processor. The processing performed by the processor 100 consists in forming the sum of the signal Mn applied to the input 4 of the summator means 6 and the signal An applied to the input 8 of the said summator means 6. The output 10 of the summator means 6 delivers the signal Sn corresponding to the cleaned signal. The output 10 is linked to the input 15 of the adaptive filtering means in order to re-injecting the signal Sn so as to calculate the signal An at the instant t+1. The signal An is delivered by the output 17 of the filtering means so as to be applied to the input 8 of the summators 6.

As described earlier with reference to FIGS. 1 and 2, the processor according to the invention determines the coefficients of the adaptive filter W so as to generate a signal An which, when added to the signal Mn, will attenuate the components relating to the nuisance signal PN until the energy of the signal Sn corresponds substantially to the energy of the useful signal Un.

In practice, the digital signal Sn from the processor 100 is transformed into an analog signal by a digital/analog restitution module 132 similar to that described with reference to FIG. 1.

With digital summators, dispensing with the acoustic or mechanical actuators of the source of counter-noise still further simplifies the calculations insofar as the transfer function is now equal to that of the electronic path between the input 15 and the output 17 in the processor, that is to say equal to 1.

It is relevant to remark that the processing minimizes only those components related to the nuisance signal Pn. Consequently, the overlapping of the energy bands of the signals Pn and Un is not problematic.

Unlike in the case of the analog device described with reference to FIGS. 1 and 2, the signal Mn is digitized. Under these conditions, it is necessary to adapt the sampling frequency of the processing to the useful signal, and of the nuisance signal. If it is desired not to lose information related to the useful signal Un, it is expedient to work at fairly high sampling frequencies, of the order of 40 to 50 kHz, for example, in order to cover the entire audio band stretching from 20 Hz to 20 kHz. Under these conditions, it is necessary to use processors and converters which are very fast to perform the acquisitions and calculations.

According to another embodiment of the invention, in respect of the analog or digital version, there is provision to add automatic gain control to the reference channel, that is to say that associated with the sensor 16.

This controller can replace or supplement the pre-amplification in the analog/digital acquisition module associated with the acquisition of the reference acoustic signal.

The function of this controller is to provide the reference signal with the same amplitude, irrespective of the amplitude of the input signal.

Thus, in the presence of strong or weak nuisance noise, the processor processes reference noise of like amplitude. This results in a better dynamic range in respect of the signal processing.

The subject of the present invention is also a process for extracting a useful acoustic signal Un from a composite acoustic signal Mn comprising nuisance components Pn.

Generally, the process comprises the following steps:
a) providing first sensor means 2, which are arranged at a first chosen location and are able to pick up the composite acoustic signal Mn,
b) providing second sensor means 16, which are arranged at a second location chosen according to a predetermined geometric relationship with the first location, and are able to pick up, in real time, a reference acoustic signal Rn which it substantially correlated with the nuisance components Pn of the composite acoustic signal Mn and is capable of propagating from the said second location to the said first location,
c) providing filtering means 12 possessing at least a first input 14 linked to the second sensor means 16, and an output 17, and
d) providing extraction means 6 possessing a first input 4 linked to the first sensor means 2, a second input 8 linked to the output 17 of the filtering means 12, and an output 10, and
e) determining at least some of the coefficients of the filtering means 12 until the signal Sn leaving the output 10 of the extraction means corresponds substantially to the useful acoustic signal Un selectively rid of the nuisance components Pn.

Usually, the filtering means 12 are of adaptive type with a second input 15 linked to the output 10 of the extraction means 6, like those described with reference to FIGS. 1 to 4.

Under these conditions, step a) according to the invention consists in the following step:
e1) adapting at least some of the coefficients of the filtering means 12, in real time, according to an algorithm chosen so as to minimize the energy of the composite acoustic signal Mn as a function of the energy of the reference acoustic signal Rn, until the signal Sn leaving the output 10 of the extraction means 6 corresponds substantially to the useful acoustic signal Un selectively rid of the nuisance components Pn. For certain useful acoustic signal extraction applications, it may be beneficial and cheaper to Use fixed, preferably analog, filtering means, the filtering coefficients of which are determined, beforehand on completion of step e1), with the aid of adaptive filtering means such as those described with reference to FIGS. 1 to 4. The conditions of propagation of the acoustic signals in extraction mode with fixed filtering means must then be substantially similar to those in the mode for determining the filtering coefficients with the adaptive filtering means.

We claim:

1. A device for extracting a useful acoustic signal (Un) from a composite acoustic signal (Mn) comprising nuisance components (Pn), the device being one which comprises:
first sensor means (2), which are arranged at a first chosen location and are able to pick up the composite acoustic signal (Mn),
second sensor means (16), which are arranged at a second location chosen according to a predetermined geometric relationship with the first location, and are able to pick up, in real time, a reference acoustic signal (Rn) which is substantially correlated with the nuisance components (Pn) of the composite acoustic signal (Mn) and is capable of propagating from the said second location to the said first location,
filtering means, of the adaptive type, (12) possessing a first input (14) linked to the second sensor means (16), a second input (15) and an output (17), and
extraction means (6) possessing a first input (4) linked to the first sensor means (2), a second input (8) linked to the output (17) of the filtering means (12), and an output (10) linked to the second input (15) of the filtering means (12), wherein the second location is chosen so that the reference acoustic signal (Rn) contains no information related to the useful signal (Un) and wherein the filtering means (12) are able to minimize the energy of the composite acoustic signal (Mn) as a function of the energy of the reference acoustic signal (Rn), by adapting at least some of the filtering coefficients in real time, until the signal (Sn) leaving the output (10) of the extraction means (6) corresponds substantially to the useful acoustic signal (Un) selectively rid of the nuisance components (Pn).

2. The device as claimed in claim 1, wherein the extraction means (6) are summator means of the analog type, wherein it furthermore comprises an acquisition stage comprising first analog/digital acquisition means (18), possessing an input (20) linked to the second sensor means (16) and an output (22) linked to the first input of the adaptive filtering means (12); and second analog/digital acquisition means (36), possessing an input (38) linked to the output (10) of the analog summator means (6) and an output (40) linked to the second input (15) of the adaptive filtering means (12), and
wherein it furthermore comprises a restitution stage comprising first digital/analog restitution means (32), possessing an input (30) linked to the output (17) of the adaptive filtering means (12) and an output (34) which delivers a signal (An) applied to the second input (8) of the analog summator means (6).

3. The device as claimed in claim 1, wherein the extraction means (6) are summator means of the digital type;

wherein it comprises digital processing means (100) possessing first (4), second (14) and third (15) inputs, and an output (10), the said digital processing means (100) being able to carry out the functions of the digital summator means (6) and of the adaptive filtering means (12), wherein it furthermore comprises an acquisition stage comprising third analog/digital acquisition means (118), possessing an input (120) linked to the first sensor means (2) and an output (122) linked to the first input (4) of the digital processing means (100); and fourth analog/digital acquisition means (136), possessing an input (138) linked to the second sensor means (16) and an output (140) linked to the second input (14) of the digital processing means (100).

4. The device as claimed in claim 3, wherein it furthermore comprises a restitution stage comprising second digital/analog restitution means (132) possessing an input (130), linked to the output (10) of the digital processing means (100), and an output (134).

5. The device as claimed in claim 1, wherein the digital filtering means (12) are of the digital signal processor type and wherein the minimization algorithm is of the least mean squares type.

6. A process for extracting a useful acoustic signal (Un) from a composite acoustic signal (Mn) comprising nuisance components (Pn), the process comprising following steps:

a) providing first sensor means (2), which are arranged at a first chosen location and are able to pick up the composite acoustic signal (Mn), b) providing second sensor means (16), which are arranged at a second location chosen according to a predetermined geometric relationship with the first location, and are able to pick up, in real time, a reference acoustic signal (Rn) which is substantially correlated with the nuisance components (Pn) of the composite acoustic signal (Mn) and is capable of propagating from the said second location to the said first location, c) providing filtering means (12), of the adaptive type, possessing a first input (14) linked to the second sensor means (16), a second input (15) and an output (17), and d) providing extraction means (6) possessing a first input (4) linked to the first sensor means (2), a second input (8) linked to the output (17) of the filtering means (12), and an output (10), the said process being one wherein the second location is chosen so that the reference signal (Rn) contains no information related to the useful signal (Un), and wherein it comprises a step consisting in:

e) minimizing the energy of the composite acoustic signal (Mn) as a function of the energy of the reference acoustic signal (Rn), by adapting at least some of the filtering coefficients in real time until the signal (Sn) leaving the output (10) of the extraction means (6) corresponds substantially to the useful acoustic signal (Un) selectively rid of the nuisance components (Pn).

* * * * *